(12) United States Patent
Momich

(10) Patent No.: US 7,540,369 B2
(45) Date of Patent: Jun. 2, 2009

(54) PRODUCT HANDLING SYSTEM

(76) Inventor: Zoran Momich, 76 Bellechase Cir., Schaumburg, IL (US) 60173-6572

( * ) Notice: Subject to any disclaimer, the term of this patent is extended or adjusted under 35 U.S.C. 154(b) by 253 days.

(21) Appl. No.: 11/312,196

(22) Filed: Dec. 19, 2005

(65) Prior Publication Data

US 2007/0137982 A1 Jun. 21, 2007

(51) Int. Cl.
*B65G 47/26* (2006.01)
*B65B 35/38* (2006.01)

(52) U.S. Cl. .............. 198/418; 198/469.1; 198/471.1; 198/793; 198/803.5; 53/446; 53/447; 53/475; 53/537; 53/540; 53/543; 53/544; 53/244

(58) Field of Classification Search ............... 53/235, 53/244, 276, 447, 443, 473, 495, 147, 540, 53/502, 446, 448, 531, 537, 538, 543, 544; 198/793, 611, 540, 534, 525, 523, 526, 518, 198/377.03–377.07, 349, 348, 867.03, 867.02, 198/803.4, 803.5, 803.15, 418–433, 463.1–487.1, 198/458; 414/799, 426, 763, 783, 798.5, 414/226.01, 749.5; 493/315–318

See application file for complete search history.

(56) References Cited

U.S. PATENT DOCUMENTS

| | | | | |
|---|---|---|---|---|
| 3,580,442 A * | 5/1971 | Rohdin et al. ............... 225/2 |
| 5,044,143 A * | 9/1991 | Ako et al. .................... 53/448 |
| 5,447,219 A * | 9/1995 | Dworak et al. .......... 198/377.04 |
| 5,575,376 A * | 11/1996 | Colamussi ............... 198/468.3 |
| 5,603,599 A * | 2/1997 | Wesslen et al. ............ 414/411 |
| 5,605,031 A * | 2/1997 | Prakken ..................... 53/537 |
| 5,829,332 A * | 11/1998 | Dieterlen ...................... 83/29 |
| 6,068,317 A * | 5/2000 | Park ......................... 294/87.1 |
| 6,439,631 B1 * | 8/2002 | Kress ......................... 294/65 |
| 6,446,416 B1 * | 9/2002 | Kuhn et al. .................. 53/445 |
| 6,837,664 B2 * | 1/2005 | Blakesley et al. ...... 414/416.01 |
| 6,925,784 B2 * | 8/2005 | Escobar et al. ............... 53/540 |
| 6,929,111 B2 * | 8/2005 | Rovers ...................... 198/429 |
| 6,942,086 B2 * | 9/2005 | Bridges et al. .......... 198/377.08 |
| 7,081,079 B2 * | 7/2006 | Baclija et al. .............. 493/315 |
| 2004/0099114 A1 * | 5/2004 | Bridges et al. ................ 83/152 |
| 2005/0008470 A1 * | 1/2005 | Baclija et al. .............. 414/736 |
| 2005/0235612 A1 * | 10/2005 | Momich ..................... 53/473 |
| 2006/0264311 A1 * | 11/2006 | Baclija et al. .............. 493/315 |
| 2008/0072549 A1 * | 3/2008 | Vissers ....................... 53/475 |

FOREIGN PATENT DOCUMENTS

EP 1544110 A1 * 6/2005
WO WO 9505312 A1 * 2/1995

* cited by examiner

*Primary Examiner*—Gene Crawford
*Assistant Examiner*—William R Harp
(74) *Attorney, Agent, or Firm*—Pauley Petersen & Erickson

(57) ABSTRACT

A system and method of providing a product to a conveyor and/or carton includes a wheel and a plurality of carriers arranged in rows. A distance between each carrier in the plurality of carriers is adjustable as the product is transferred around a circumference of the wheel. Optionally, a height of each product relative to an adjacent product is likewise adjustable.

18 Claims, 10 Drawing Sheets

PRODUCT HANDLING SYSTEM

BACKGROUND OF THE INVENTION

1. Field of the Invention

This invention relates to a product handling system whereby a row of products may be transferred while adjusting a distance between each product in the row.

2. Description of Related Art

Rotary pickers are used in varied applications requiring the deposit of a product or, more typically, a number of products, such as food, pharmaceuticals and other items, onto conveyors and/or into cartons. Rotary pickers traditionally engage a product below and transfer the product into a carton or conveyor above.

SUMMARY OF THE INVENTION

It is one object of this invention to provide a product handling system that moves, configures and deposits product into an outfeed predictably, completely, quickly and accurately.

It is another object of this invention to provide a product handling system that provides products in a shingled configuration to an outfeed.

These and other objects of this invention are addressed by a product handling system that includes a rotary picker and a plurality of carriers positioned circumferentially around the rotary picker. One or more carriers are positioned at each circumferential position around the rotary picker. Preferably, multiple carriers are positioned in rows at each circumferential position. A distance between each carrier in a row is preferably expandable and/or contractable relative to each other. As a result, a product may be engaged with a carrier and then moved closer to, or farther away, from an adjacent product prior to offloading the products from the rotary picker.

According to one preferred embodiment of this invention, the rotary picker includes a plurality of scissor arms positioned circumferentially around a wheel. Each scissor arm includes one or more carriers and more preferably two or more carriers. Each carrier further includes one or more product grips, such as suction cups. The scissor arms may then in turn rotate relative to the wheel or remain fixed relative to the wheel.

Each carrier on the scissor arm may engage with a product and then the scissor arm may be adjusted to draw adjacent product closer together or move adjacent product farther apart. A desired configuration of product may then be packaged or moved to an additional secondary operation.

BRIEF DESCRIPTION OF THE DRAWINGS

These and other objects and features of this invention will be better understood from the following descriptions taken in conjunction with the drawings wherein.

DETAILED DESCRIPTION OF THE PREFERRED EMBODIMENTS

Figure 1:
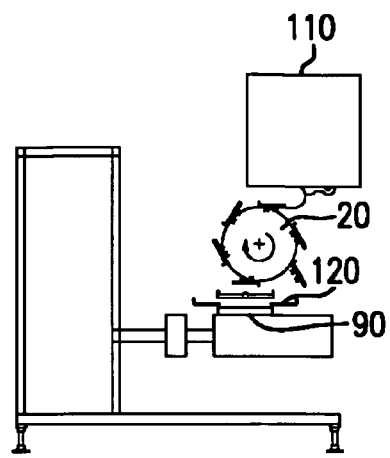
FIG. 1 is a side view of a product handling system according to one preferred embodiment of this invention.
Figure 2:
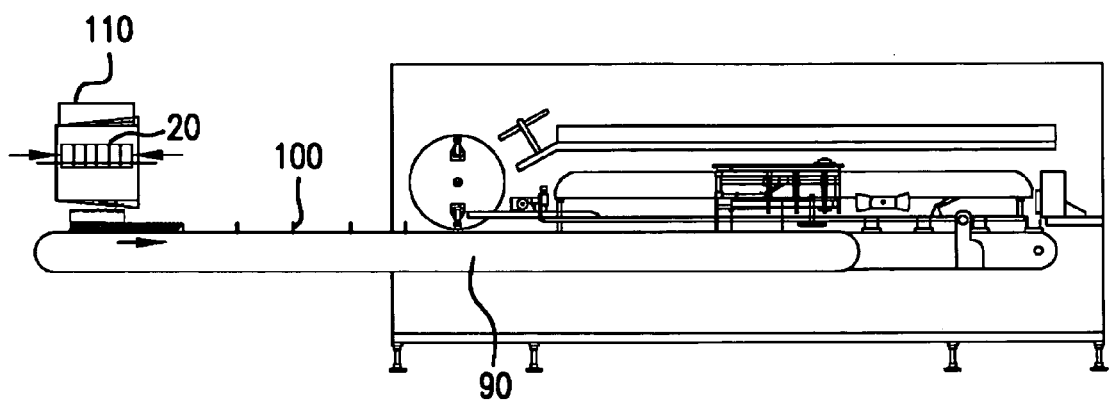
FIG. 2 is a front view of the product handling system shown in FIG. 1.
Figure 3:
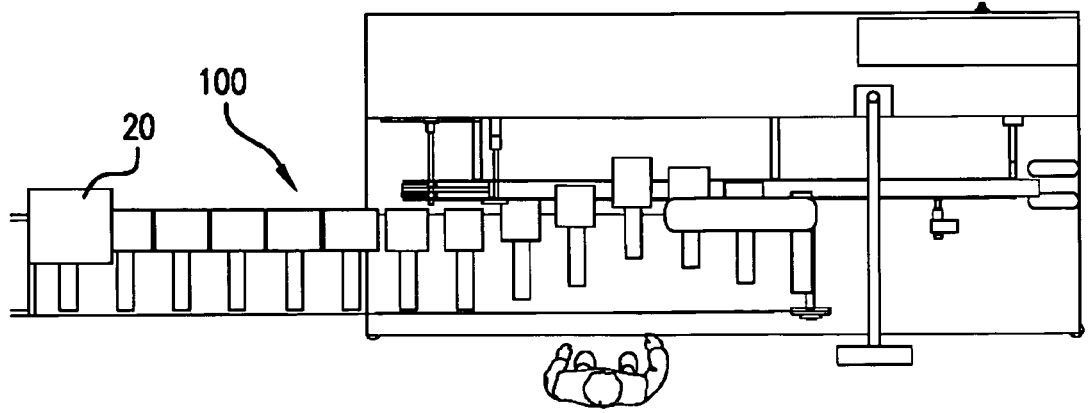
FIG. 3 is a top view of the product handling system shown in FIG. 1.
Figure 4:
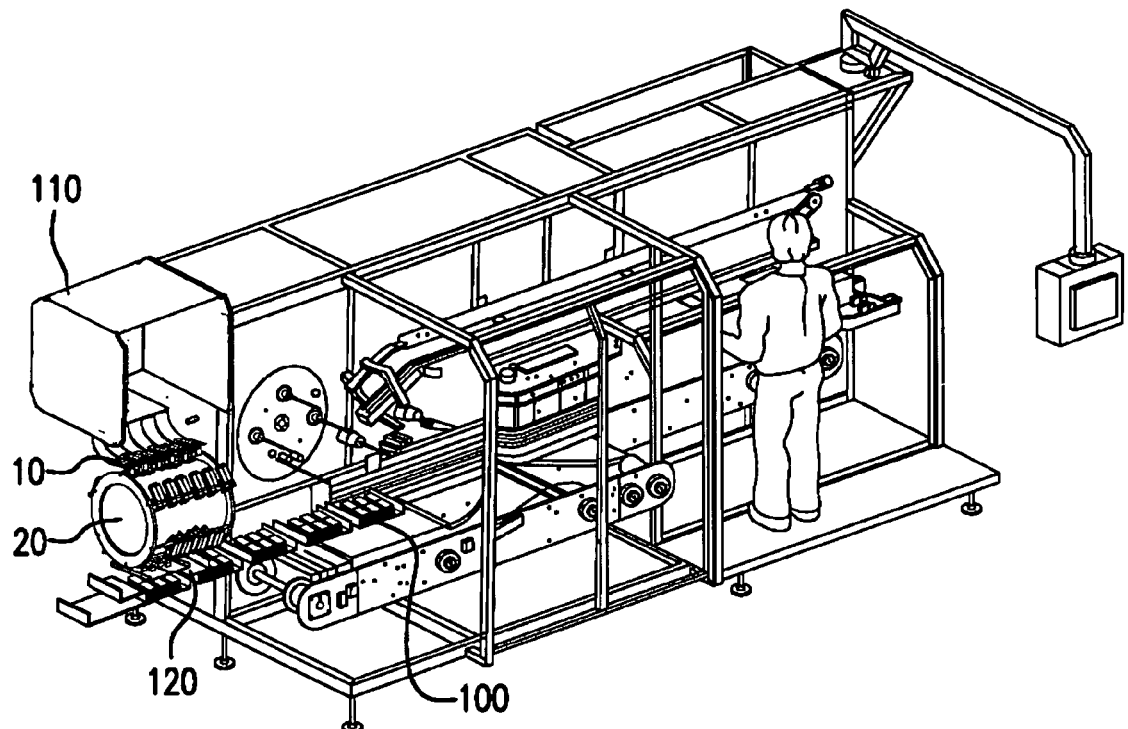
FIG. 4 is a perspective elevational front view of a product handling system according to one preferred embodiment of this invention.

FIGS. 1-4 show a product handling system according to various preferred embodiments of this invention. According to a preferred embodiment of this invention, and as shown in FIGS. 1-4, product is transferred from a product feeder, such as infeeder 110, through the product handling system in a generally continuous stream to an outfeed 120 such as outfeed conveyor 90, cartoner 100 or similar finishing area. The product and/or cartons of product may then conveyed be from the cartoner for closure, palletizing, shipping, etc.

The term "product" as used herein may be one or more items that are to be transferred, handled, contained within a carton including packages, papers, cards, blister packs and any other product that may be boxed or cartoned according to the method and apparatus described herein. Product may include or comprise candy, food, beverages, pharmaceuticals, consumer goods, bulk goods or any other item that requires transferring, cartoning, finishing, transporting or similar secondary operations.

Products 10 may be presented and transferred to rotary picker 20 in a number of ways known to those having ordinary skill in the art. As described above, products may include packets, individual or bulk food items, pharmaceuticals, bottles, bags, trays and any other product requiring transferring and/or cartoning. As such, equipment for presenting and transferring products to rotary picker 20 need only be capable of placing, dropping, sliding or otherwise presenting product to rotary picker 20.

As shown in FIGS. 1-4, product infeeder 110 provides a plurality of products 10 in a generally continuous and orderly manner to rotary picker 20. Preferably, products 10 are provided in a row to rotary picker 20. According to a preferred embodiment of this invention, infeeder 110 is positioned generally above rotary picker 20 and outfeed 120 is positioned generally below rotary picker 20.

Figure 10:
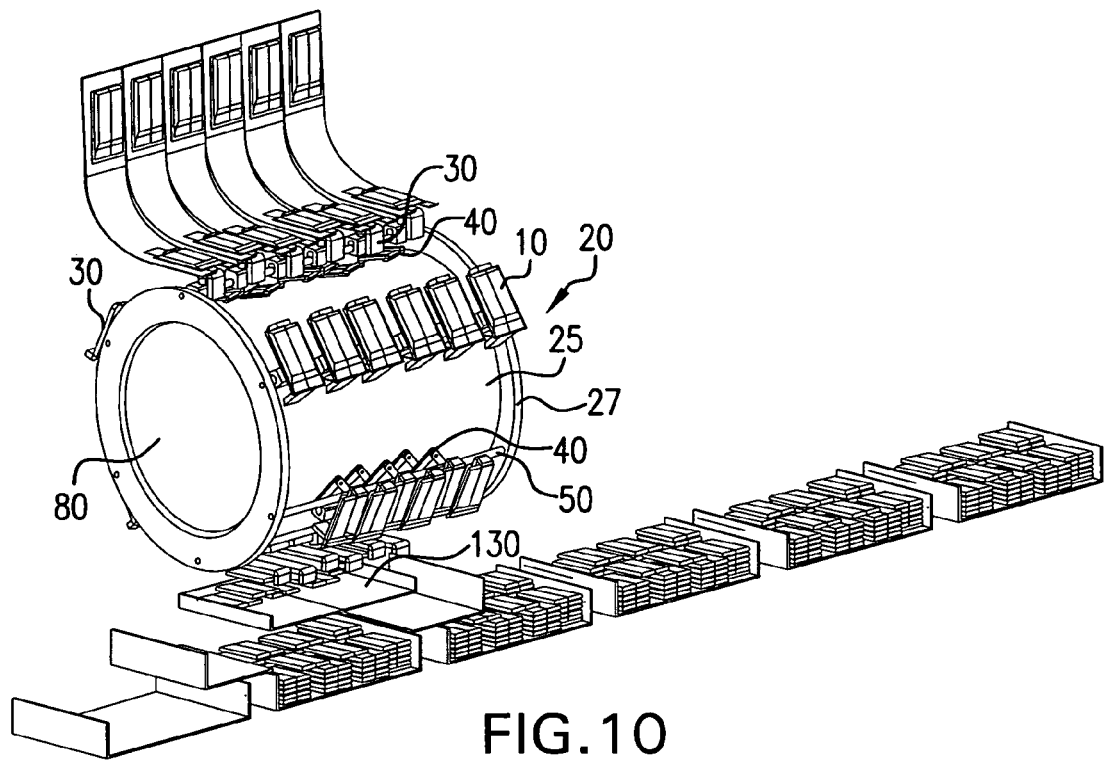
FIG. 10 is a perspective front view of a portion of a product handling system including a rotary picker according to one preferred embodiment of this invention.
Figure 11:
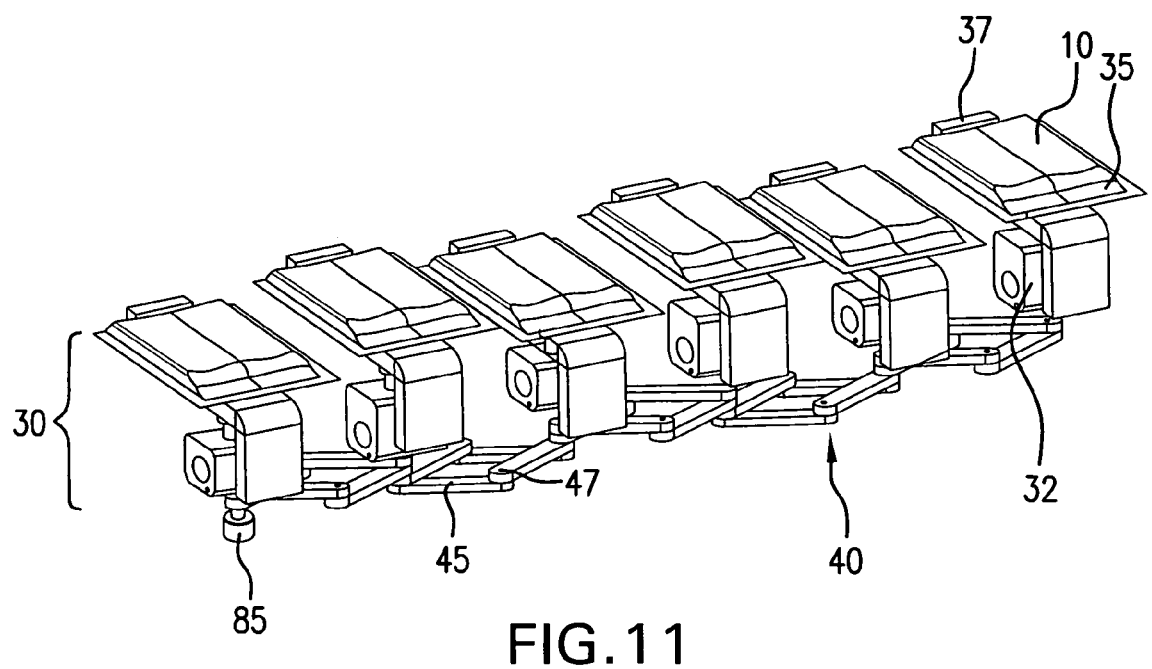
FIG. 11 is a perspective front view of a row of carriers according to one preferred embodiment of this invention.
Figure 15:
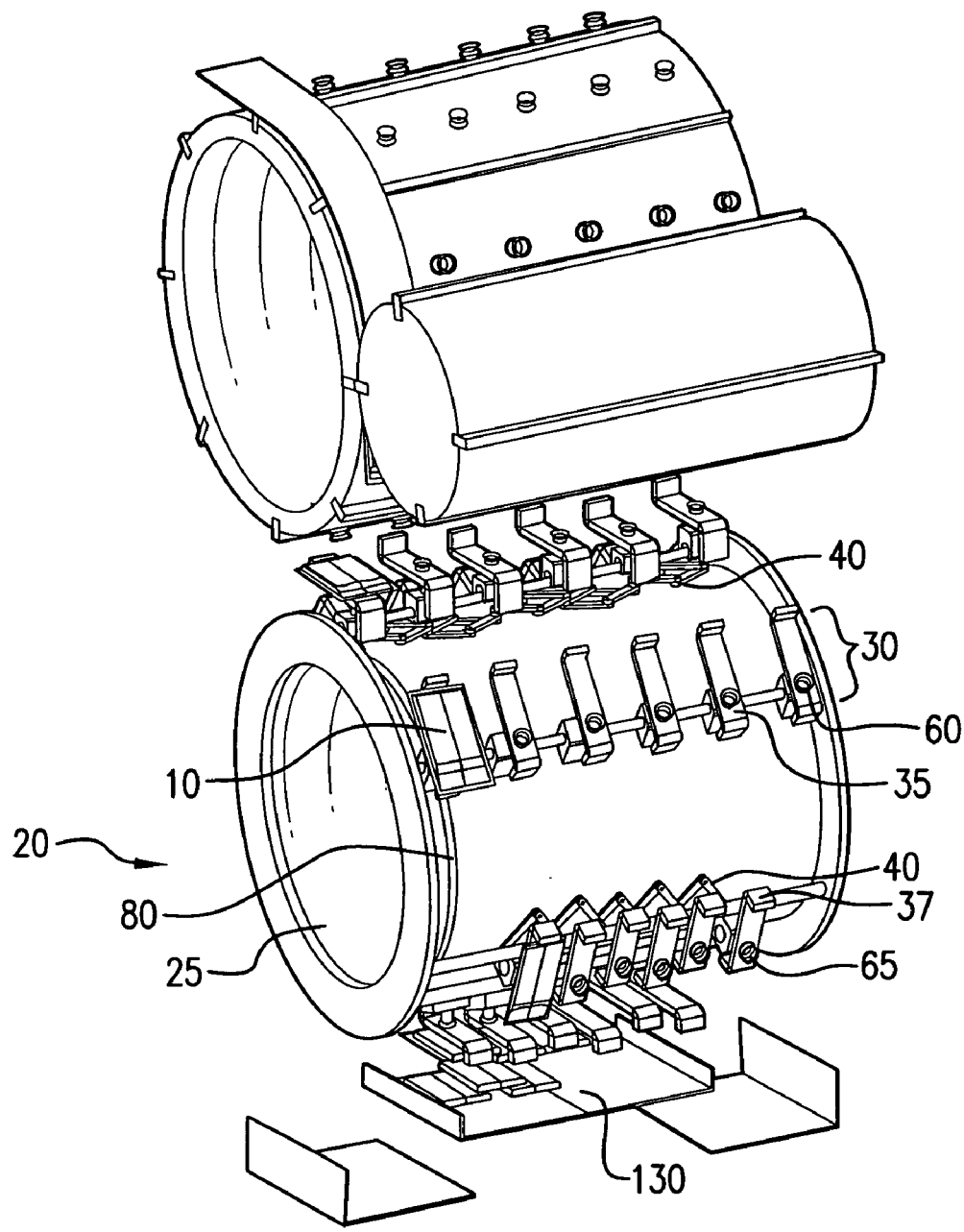
FIG. 15 is a perspective front view of a portion of a product handling system including a rotary picker holding one product per row according to one preferred embodiment of this invention.
Figure 16:
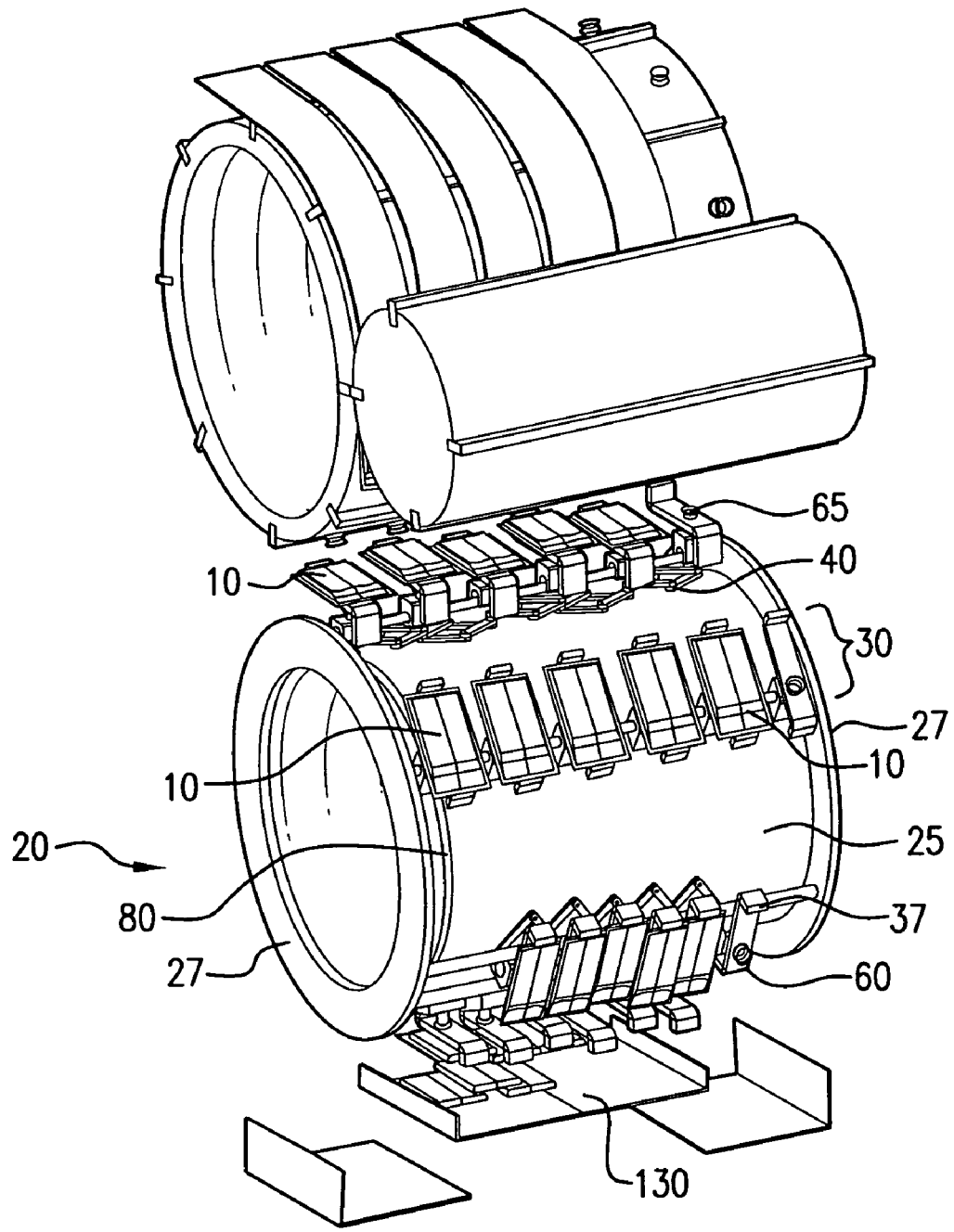
FIG. 16 is a perspective front view of a portion of a product handling system including a rotary picker holding five products per row according to one preferred embodiment of this invention.
Figure 17:
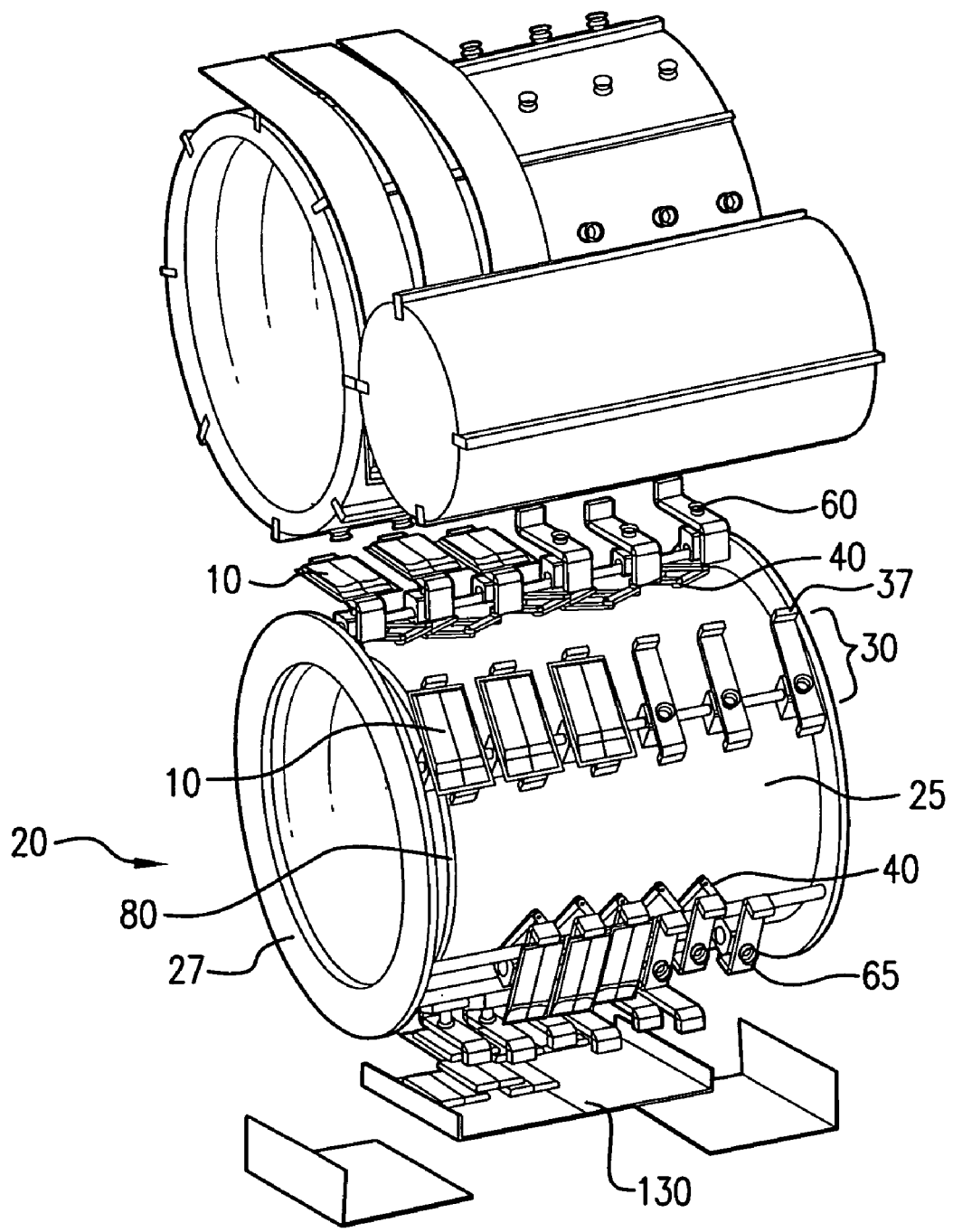
FIG. 17 is a perspective front view of a portion of a product handling system including a rotary picker holding three products per row according to one preferred embodiment of this invention.

As shown in FIGS. 1-6, 10 and 15-19, a device for transferring product 10 according to one preferred embodiment of this invention includes rotary picker 20 comprising wheel 25 and a plurality of rows of carriers 30 positioned circumferentially around wheel 25. As shown in FIG. 10, a group of six carriers 30 may be positioned in each row. FIGS. 15, 16 and 17 show that one, three or five products 10, respectively, and/or carriers 30 may be positioned within each row of carriers 30. Any other suitable number of carriers 30 and/or products 10 may be positioned in rows and in any number of desired circumferential positions around rotary wheel 25.

Figure 6:
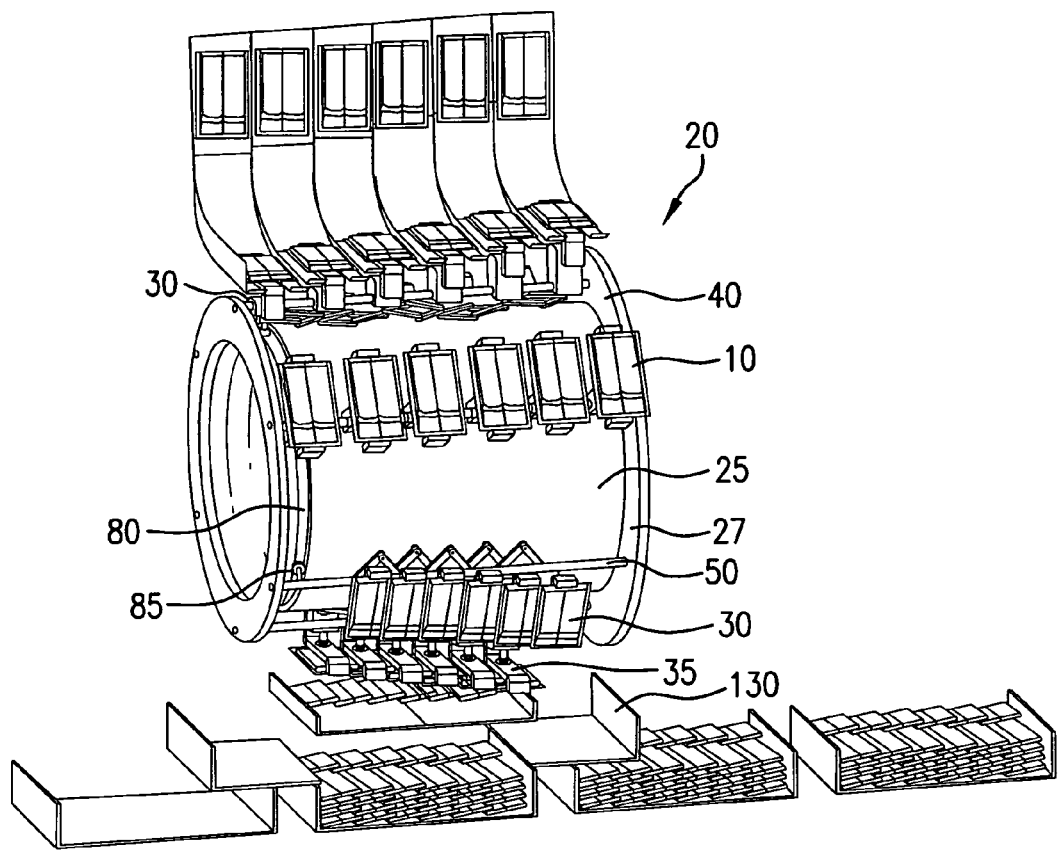
FIG. 6 is a perspective front view of a portion of a product handling system including a rotary picker according to one preferred embodiment of this invention.
Figure 7:
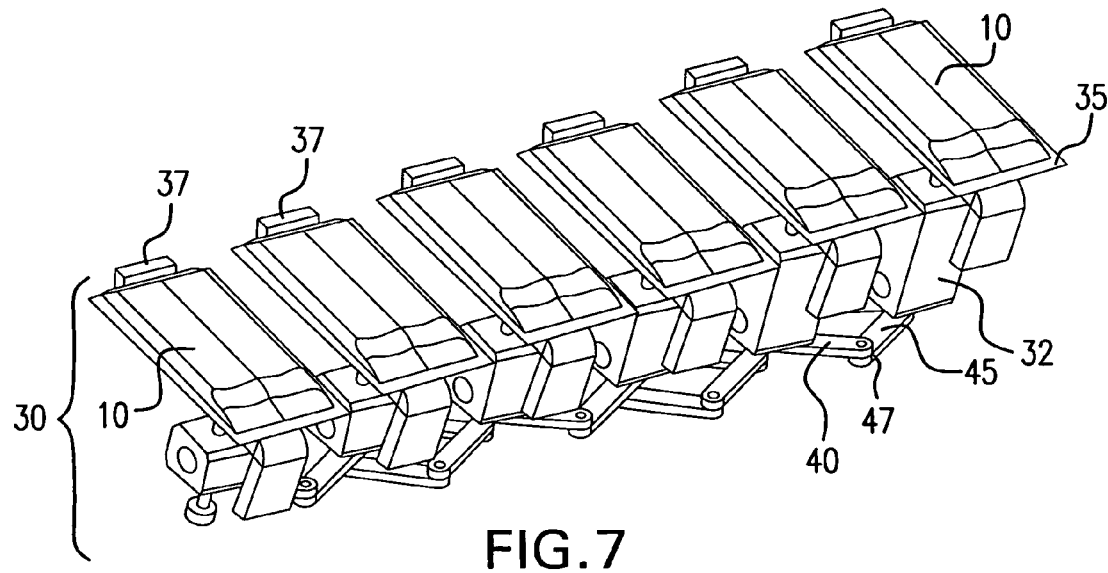
FIG. 7 is a perspective front view of a row of carriers according to one preferred embodiment of this invention.
Figure 8:
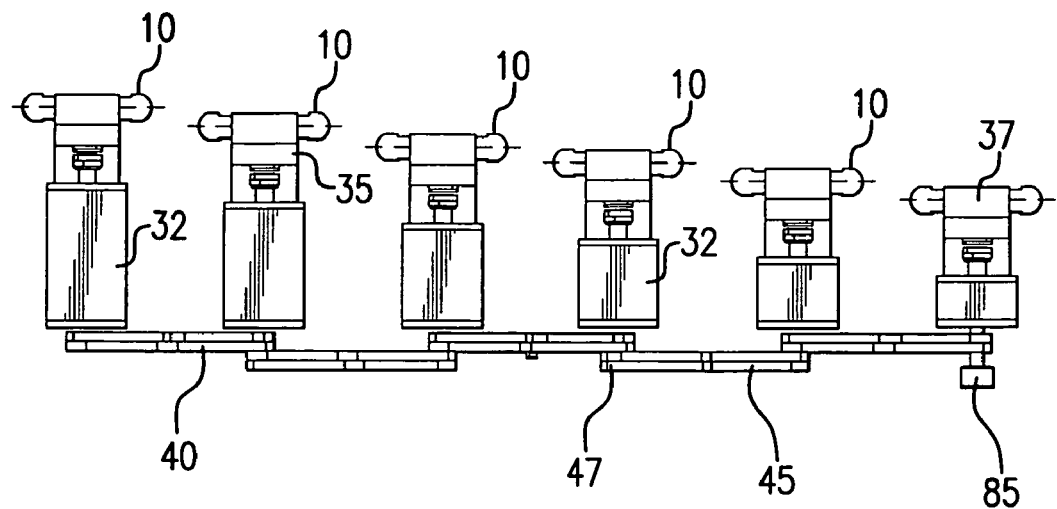
FIG. 8 is a side view of the row of carriers shown in FIG. 7 in an expanded position.
Figure 9:
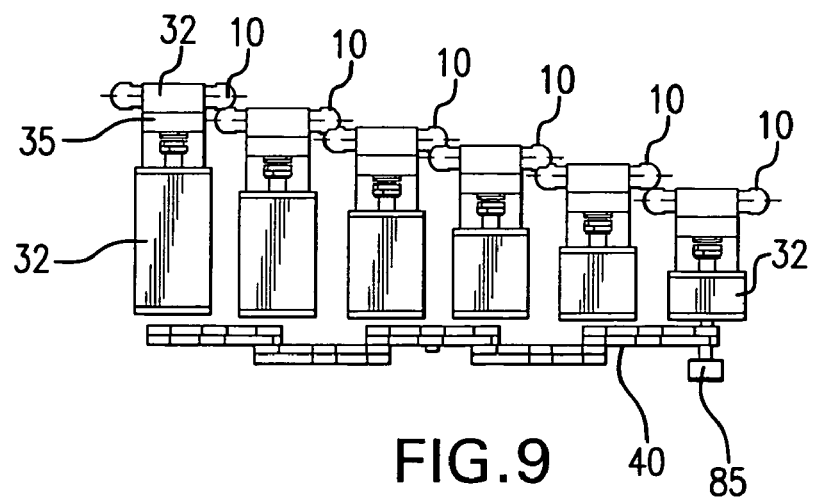
FIG. 9 is a side view of the row of carriers shown in FIG. 7 in a contracted position to shingle product on the carriers in a stepped manner.

Rotary wheel 25 may include two hubs 27 as best shown in FIG. 6 or may be constructed with multiple hubs, a single hub or a hubless design. Rotary wheel 25 is preferably configured to accommodate any desired number of carriers 30 as described above.

Figure 5:
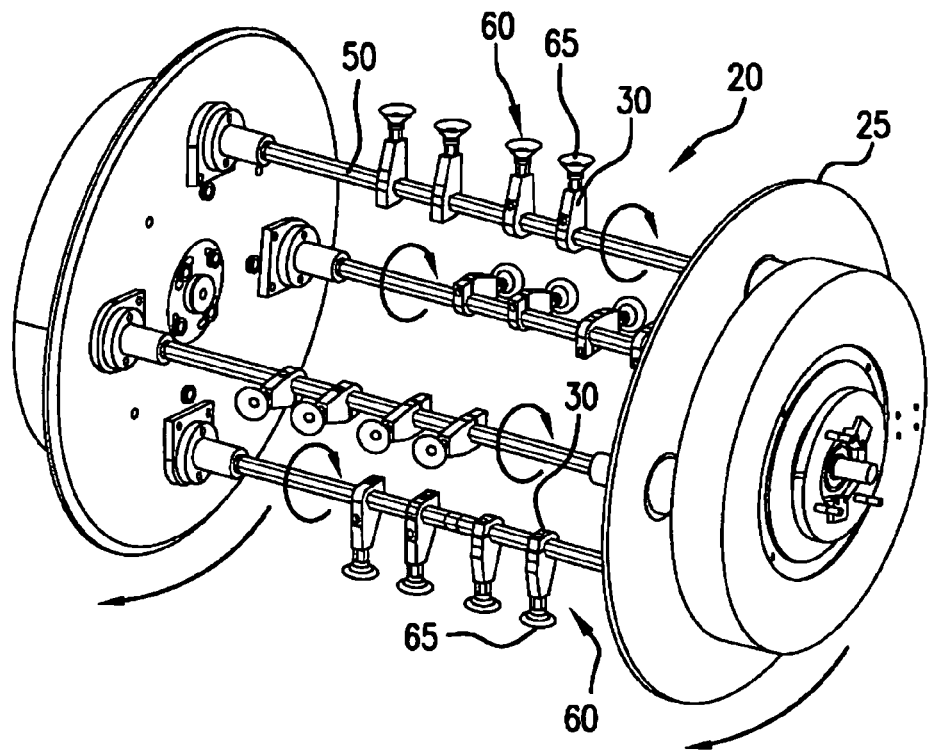
FIG. 5 is a perspective front view of a rotary wheel according to one preferred embodiment of this invention.

Each row of one or more carriers 30 are preferably positioned relative to a spindle 50 and multiple spindles 50 are accordingly spaced circumferentially around wheel 25, such as shown in FIG. 5. Although four spindles 50 are shown in FIG. 5, wheel 25 may include any number of desired spindles 50. According to one preferred embodiment of this invention, shown in FIG. 5, spindles 50 may rotate relative to wheel 25, as described in more detail herein, or alternatively, spindles 50 may be fixed relative to wheel 25.

As best shown in FIGS. 6-14, a plurality of scissor arms 40 may be positioned circumferentially around wheel 25. Scissor arms 40 are preferably positioned on, under or otherwise with respect to spindles 50. Alternatively, scissor arms 40 may be positioned in place of spindles 50.

Figure 14:
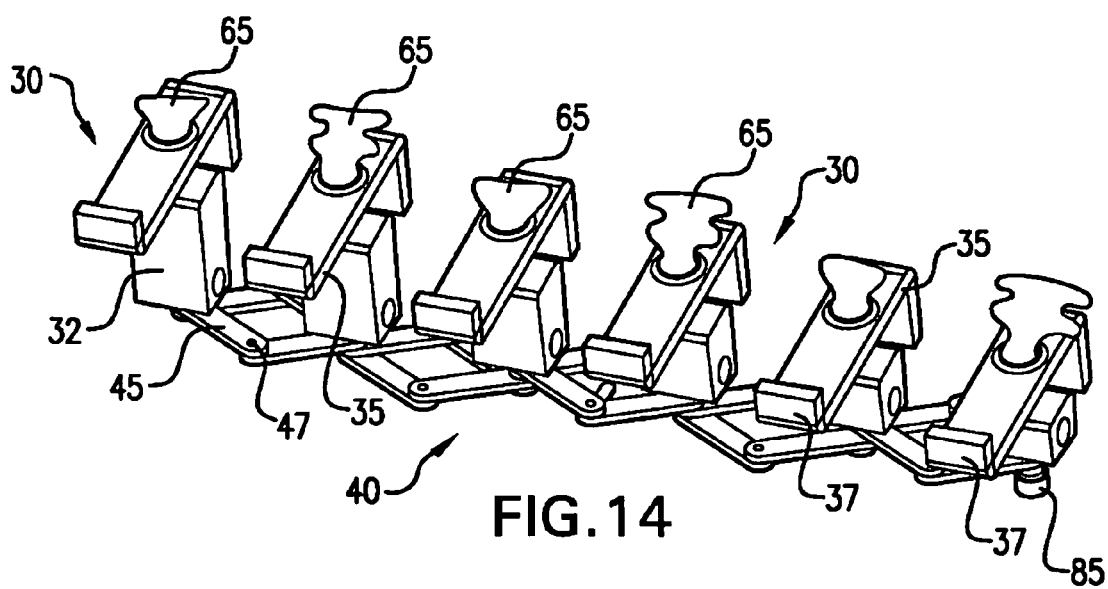
FIG. 14 is a perspective front view of a row of carriers according to one preferred embodiment of this invention.

Scissor arms 40, as shown in FIG. 14, preferably include a plurality of interconnected arms 45 that are connected at joints, such as with pins 47, to form a hinged structure that expands and/or contracts when a force is applied to one or more of the arms 45. Scissor arms 40 may comprise any other suitable configuration that permits generally linear expansion and contraction within rotary picker 20.

As shown in the figures, one or more carriers 30 are preferably positioned on each scissor arm 40. Carriers 30 preferably include block 32 and platform 35. Platform 35 may further include elbow 37, as described in more detail herein. Block 32 is preferably sized and positioned to space platform 35 from scissor arm 40 and/or wheel 25. Each carrier 30 is preferably positioned at a hinged location of scissor arm 40, such as at the location of pin 47. As a result of this configuration, when scissor arm 40 is expanded, a distance between each carrier 30 expands. Likewise, when scissor arm 40 is contracted, a distance between each carrier 30 contracts.

FIG. 6 shows rotary picker 20 and wheel 25 further including cam 80 positioned with respect to wheel 25. Cam 80 preferably follows a desired path around wheel 25 to urge scissor arm 40 into a desired configuration. Scissor arm 40 preferably includes cam follower 85 that tracks cam 80 thereby expanding, contracting or maintaining a configuration of scissor arm 40. Such motion thereby translates to carriers 30 within each row to either move carriers 30 close to each adjacent carrier 30 or space carriers 30 further from each adjacent carrier 30.

Carrier 30 preferably further includes at least one product grip 60 positioned on or within each platform 35 of carrier 30. More specifically, product grip 60 preferably comprises suction cup 65. Suction cup 65 is preferably pneumatic although traditional suction cups 65 may be used in appropriate applications. Carrier 30 including block 32 and/or platform 35 therefore may contain an air channel for providing a vacuum to suction cup 65.

According to one preferred embodiment of this invention, product grip 60 on one carrier 30 in the row is positioned at a different height than product grip 60 of each carrier 30 adjacent to that one carrier 30. Such arrangements are shown in one embodiment at FIGS. 7-9 and in another embodiment in FIGS. 11-13. Although it may be desirable to vary the height of product grip 60 by varying the height of block 32, it may be preferable that each product grip 60 is positioned at the same height when products 10 are engaged from feeder 15. According to one preferred embodiment of this invention, each carrier 30 may include product grip 60, such as suction cup 65, having a different height and/or profile than suction cup 65 on each adjacent carrier 30. Such an arrangement is shown in FIG. 14.

Figure 12:
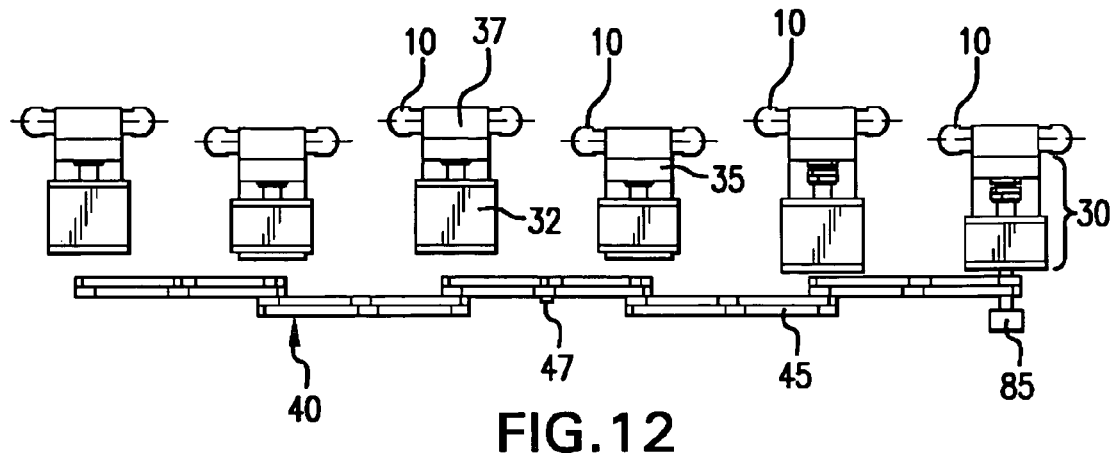
FIG. 12 is a side view of the row of carriers shown in FIG. 11 in an expanded position.
Figure 13:
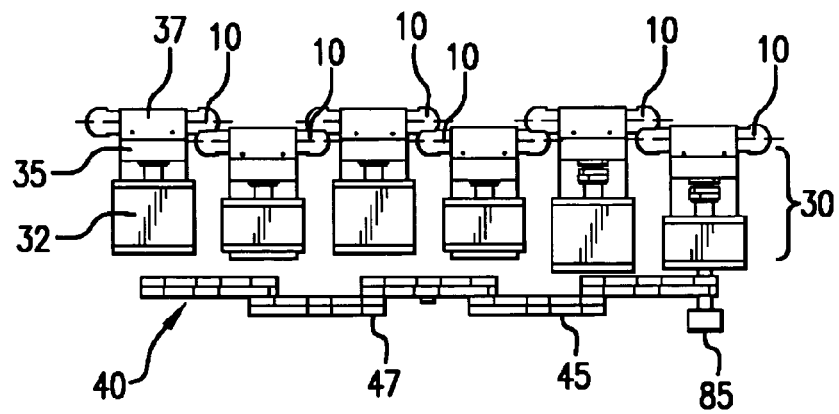
FIG. 13 is a side view of the row of carriers shown in FIG. 11 in a contracted position to shingle product on the carriers in an alternating manner.

In operation, the suction cups 65 having different heights and/or profiles create a staggered arrangement of products 10 in the row of products 10 after products 10 are engaged with product grip 60. Such staggered arrangement of products 10 such as shown in FIG. 12 may be effected with suction cup 65 having a first profile collapsing a lesser amount than suction cup 65 having a second profile following application of a negative pressure.

According to a method of operation of the subject invention, products are grouped for handling as herein described. Handling may include cartoning, indexing, stacking, shingling, transporting and/or any other suitable operation. As described, a stream of products 10 in multiple rows is preferably provided from infeeder 110 to rotary picker 20.

Rotary picker 20 is preferably continuously rotating relative to the stream of products. In addition, spindles 50 and/or scissor arms 40 may additionally be rotating relative to rotary picker 20 but in an opposite direction as rotary picker 20. As a result of this counter-rotation, carriers 30 on rotary wheel 20 may pick up products 10 at a zero speed relative to the infeed of products 10, thereby permitting faster system speeds. Alternatively, such spindles 50 and/or scissor arms 40 may be fixed within rotary picker 20.

As a row of the products 10 is provided to rotary picker 20, each of the plurality of carriers 30 arranged on the spindle 50 grips a corresponding product 10 using product grip 60, such as suction cup 65, and/or using positive engagement, such as with elbow 37 of carrier 30. As a row of products 10 proceeds around rotary picker 20 toward a discharge, a distance between each carrier 30 on spindle 50 is adjusted into a desired indexed relationship. Such relationship may be spaced to provide a desired pitch between each product 10 or may be clustered together to provide a desired shingling or overlap between and among products 10 in row.

As described above, the distance between each carrier 30 and thus the distance between each product 10 may be adjusted with a scissor arm 40 and cam 80 arrangement or using any other appropriate technique known to those having ordinary skill in the art. By contracting a distance between each carrier 30 on spindle 50 or expanding a distance between each carrier 30 on spindle 50, the present invention collects products 10 at infeeder 110 in a first arrangement and deposits them at outfeed 120 in a second arrangement.

Figure 18:
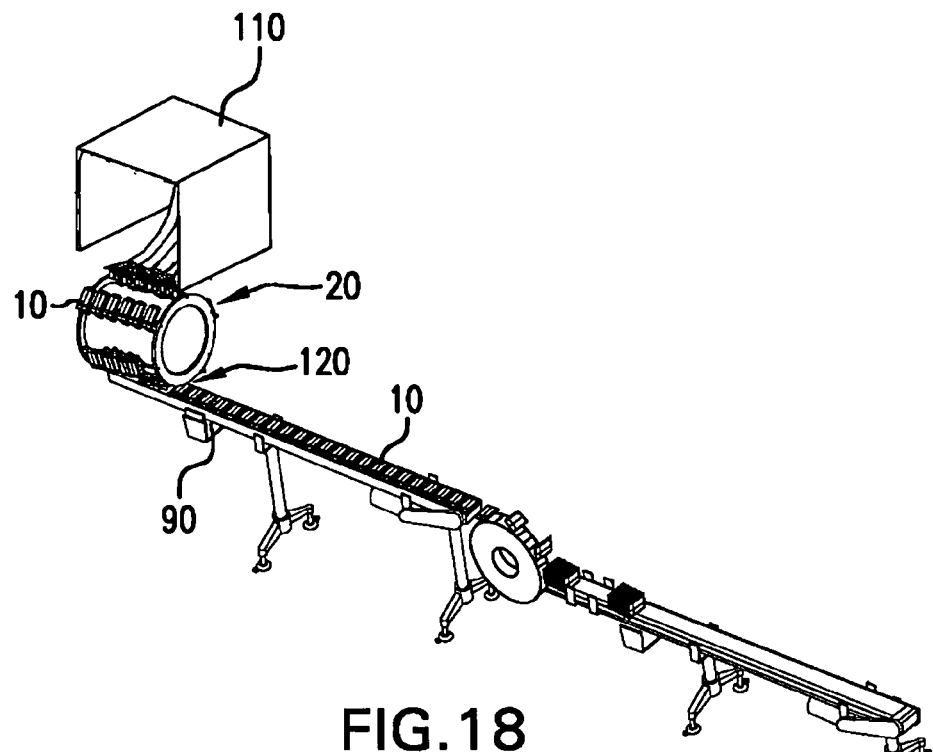
FIG. 18 is a perspective elevational front view of a product handling system according to one preferred embodiment of this invention.
Figure 19:
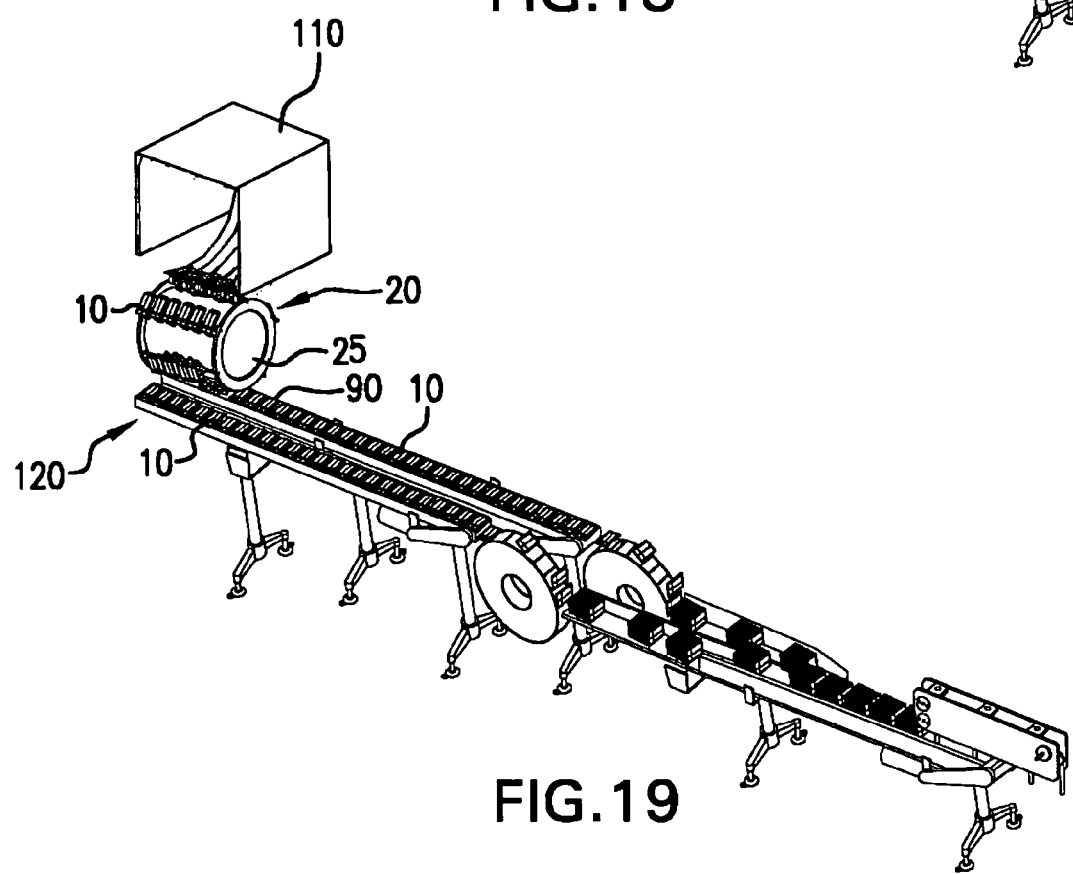
FIG. 19 is a perspective elevational front view of a product handling system according to one preferred embodiment of this invention.

Following adjustment of the row of products 10 into a desired indexed relationship, the row of products 10 is provided to outfeed 120 such as outfeed conveyor 90. The resulting row of products may be shingled so that an elevation of one product 10 in the row is adjusted relative to the elevation of at least one other product 10 in the row. FIG. 6 shows products shingled in this manner. Alternatively, the resulting row of products may be shingled so that an edge of each product 10 of overlays an edge of each adjacent product 10. FIG. 10 shows products shingled in this manner. Alternatively, the resulting row of one or more products may be indexed so that a constant and desired pitch is created between each product. FIGS. 18 and 19 show products indexed in this manner.

Products 10, when shingled in a manner such as shown in FIGS. 6 and 10, may be more efficiently stacked into cartons or similar containers. As such, more products 10 may be contained within a similar-sized container as a group of randomly stacked products 10.

Products 10, whether shingled or spaced at a pitch, may be released directly into pre-accumulation tray 130, a carton or may be released into outfeed 120, such as outfeed conveyor 90. As shown in FIGS. 6, 10 and 15-17, products 10 may be released into a pre-accumulation tray 130 that collects and, in turn, dispatches product into a container and/or carton chain 100. From outfeed 120, products 10 may be directed to a carton chain, a horizontal cartoner, a wrapping station or any other suitable secondary operation.

According to one preferred embodiment of this invention, such as shown in FIG. 19, rows of products 10 may be selectively released at a different rotational release point from each prior row. In this manner, two or more outfeed conveyors 90 may be positioned beneath rotary picker 20 to enable parallel processing of two or more indexed sets of products 10. Suction cups 65 may be configured to release rows of products 10 at a desired rotational release point of rotary picker 20.

The product handling system as described herein may include synchronized components and/or line shafting that is executed either mechanically, electronically or a combination of both using gears, belts, servomechanism and other similar components known to those having ordinary skill in the art.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method of grouping products for handling, the method comprising:
    providing a stream of products in multiple rows;
    rotating a rotary picker relative to the stream of products;
    picking a row of the products with the rotary picker, the rotary picker having a plurality of spindles positioned circumferentially around the rotary picker, each spindle of the plurality of spindles including a plurality of carriers arranged on the spindle, each product of the products gripped with a carrier, the products picked up in a first arrangement;
    changing an elevation of one product in the row relative to the elevation of at least one other product in the row;
    adjusting a distance between each carrier on the spindle as the row of the products proceeds around the rotary picker toward discharge such that the row of the products is picked up in the first arrangement and released in a second arrangement; and
    releasing the products in the row onto a conveyor in the second arrangement having a different pitch than the first arrangement.

2. The method of claim 1 further comprising the step of:
    contracting a distance between each carrier on the spindle.

3. The method of claim 1 further comprising the step Of:
    expanding a distance between each carrier on the spindle.

4. The method of claim 1 further comprising the steps of:
    providing a container on the conveyor; and
    placing the products in the row into the container in a shingled formation.

5. The method of claim 1 further comprising the steps of:
    providing a container on the conveyor; and
    placing the multiple products in the row into the container so that an edge of each product of the multiple products overlays an edge of an adjacent product of the multiple products.

6. The method of claim 1 further comprising the steps of:
    providing a container on the conveyor; and
    placing the multiple products in the row into the container so that each product of the multiple products is positioned at a different elevation from each adjacent product of the multiple products.

7. The method of claim 1 further comprising the step of:
    positioning a scissor arm across the spindle, the scissor arm having a plurality of joints, each joint supporting a carrier.

8. The method of claim 7 further comprising the steps of:
    connecting the scissor arm to a cam in the rotary picker; and
    adjusting the distance between each carrier on the scissor arm with the cam.

9. The method of claim 1 further comprising the step of:
    rotating each spindle in a direction opposite a direction of rotation of the rotary picker as the rotary picker rotates.

10. The method of claim 1 further comprising the step of:
    selectively releasing the products in the row at a different rotational release point from each adjacent row.

11. A device for transferring product onto a conveyor, the device comprising:
    a wheel;
    a plurality of scissor arms positioned circumferentially around the wheel;
    a plurality of carriers positioned on each scissor arm of the plurality of scissor arms, a distance between each carrier of the plurality of carriers adjustable during product transfer; and
    at least one product grip positioned on each carrier of the plurality of carriers, the at least one product grip on each carrier of the plurality of carriers is positionable at a different height than a product grip of each adjacent carrier during product transfer.

12. The device of claim 11 further comprising:
    a plurality of spindles positioned circumferentially around the wheel, a scissor arm of the plurality of scissor arms positioned on each spindle of the plurality of spindles.

13. The device of claim 11 further comprising:
    a cam positioned with respect to the rotary wheel; and
    a cam follower connected to each scissor arm.

14. The device of claim 11 wherein the product grip comprises a pneumatic suction cup.

15. The device of claim 11 wherein each carrier of the plurality of carriers further includes a trailing elbow.

16. A packaging system for transferring product onto a conveyor, the system comprising:
- an product feeder providing a row of products;
- a wheel connected with respect to the product feeder to receive the row of products;
- a plurality of rows of carriers positioned circumferentially around the wheel;
- a product grip positioned on each carrier of the plurality of carriers, each product grip capturing a product in the row of products and each product grip positionable at a different height than a product grip of each adjacent carrier during product transfer;
- a scissor arm connected with each row of the plurality of rows of carriers for adjusting a distance between each carrier in the row during product transfer; and
- an outfeed conveyor to receive the row of products from the wheel.

17. The system of claim 16 further comprising:
- a carton chain positioned with respect to the outfeed conveyor.

18. The system of claim 16 wherein the product grip comprises a pneumatic suction cup, each pneumatic suction cup having a different profile from the pneumatic suction cup on an adjacent carrier in the row.

* * * * *